Figure 1:
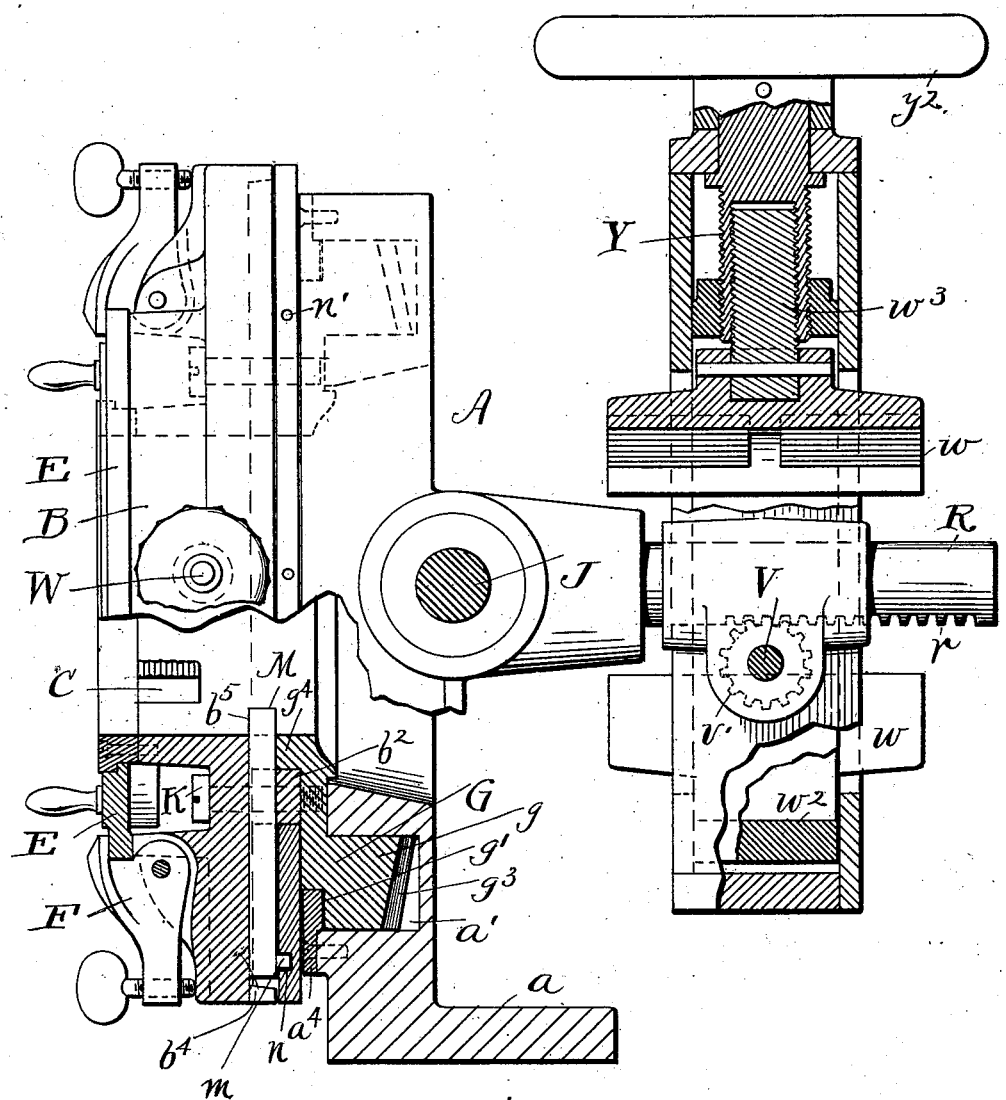

No. 694,412. Patented Mar. 4, 1902.
H. W. OSTER.
THREAD CUTTING MACHINE.
(Application filed Dec. 5, 1901.)

(No Model.) 2 Sheets—Sheet 1.

Witnesses
E. B. Gilchrist
H. W. Wise

Inventor
Herman W. Oster
By his attorneys
Thurston & Bates

No. 694,412. Patented Mar. 4, 1902.
H. W. OSTER.
THREAD CUTTING MACHINE.
(Application filed Dec. 5, 1901.)
(No Model.) 2 Sheets—Sheet 2.
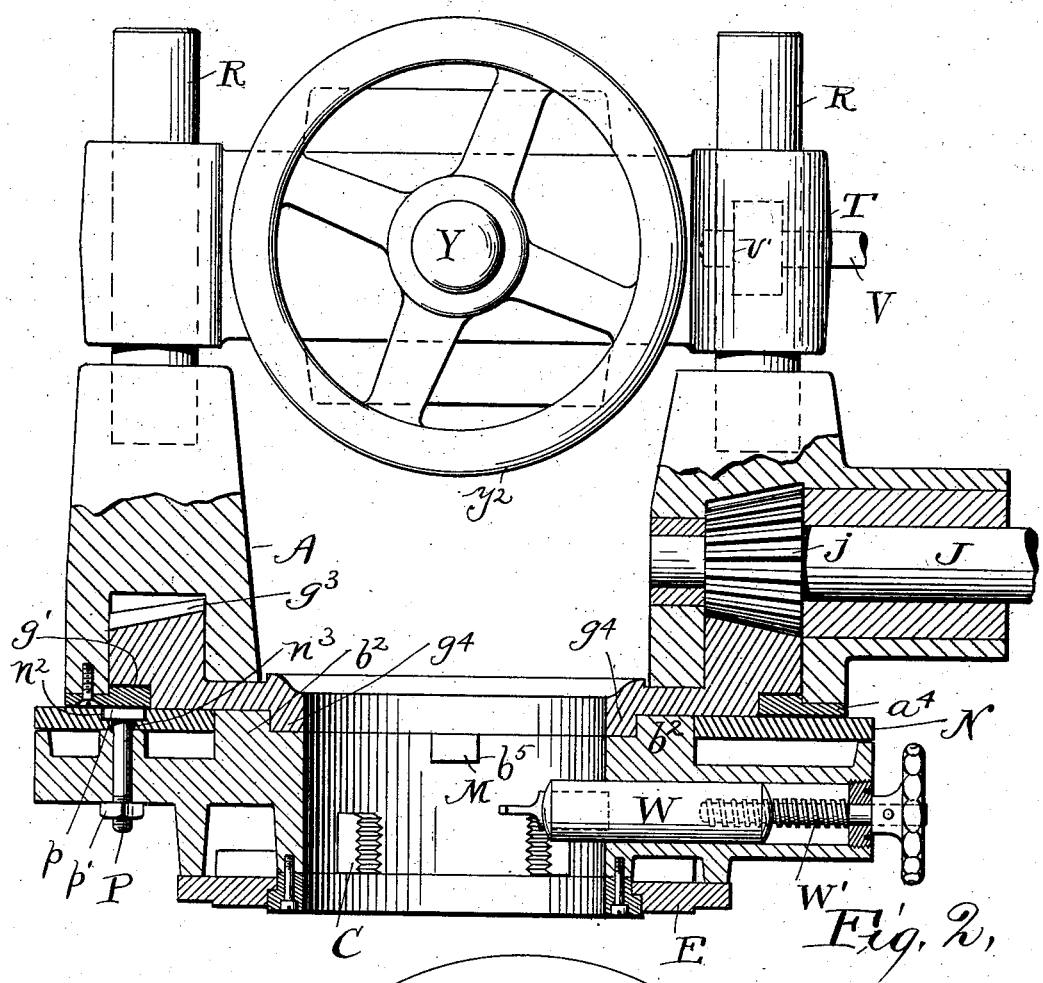
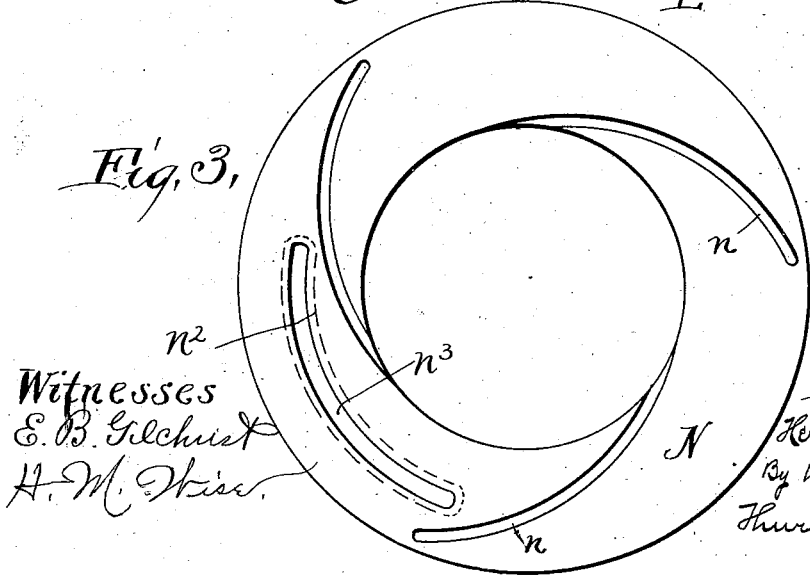
Witnesses
E. B. Gilchrist
H. M. Wise
Inventor:
Herman W. Oster
By his attorneys
Thurston & Bates

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

THREAD-CUTTING MACHINE.

SPECIFICATION forming part of Letters Patent No. 694,412, dated March 4, 1902.

Application filed December 5, 1901. Serial No. 84,777. (No model.)

*To all whom it may concern:*

Be it known that I, HERMAN W. OSTER, a citizen of the United States, residing at Cleveland, in the county of Cuyahoga and State of Ohio, have invented a certain new and useful Improvement in Thread-Cutting Machines, of which the following is a full, clear, and exact description, reference being had to the accompanying drawings.

The invention relates to improvements in power-driven machines adapted for cutting threads on the ends of pipes, bolts, or rods and for cutting off the ends thereof.

The object is to provide a machine which shall be simple and cheap in its construction and very efficient in its operation.

The invention may be here summarized as consisting in the construction and combination of parts hereinafter described, and pointed out definitely in the claims.

In the drawings, Figure 1 is a side elevation, partly sectioned, of a machine embodying my invention; and Fig. 2 is a plan view, mostly in central horizontal section, of the same machine. Fig. 3 is a rear view of the cam-ring N.

Referring to the parts by letters, A represents an annular supporting-frame having a foot $a$ or some equivalent base upon which it may rest and by which it may be secured to the floor or other suitable support. The pipe to be threaded passes axially through this frame to the rotating die-stock head B, carrying the threading-dies C. The frame also has in its rear vertical face an annular groove or recess $a'$.

The head B is provided with radially-movable dies C and with a rotatable cam-plate E, by means of which the dies are moved inward and outward. Suitable locking or clamping devices, as the levers F, are also provided, by which the cam-plate E is locked in any desired position. The head and the parts supported thereby, above described, are substantially the same as the corresponding parts of the so-called "Oster die-stock," a hand-tool, which is shown and described in Letters Patent No. 490,676, although this part of the mechanism may be of any suitable construction.

G represents an annular member having a forwardly-projecting cylindrical flange $g$, which is rotatively mounted in the annular recess $a'$ in the frame. It is held in this recess by an annular gib $a^4$, secured to the frame and entering a rabbet $g'$ in the member G. The front face of the cylindrical flange $g$ is provided with bevel-gear teeth $g^3$, which mesh with a bevel-gear $j$, secured to a shaft J, which is rotatably mounted in the frame A. The head B is provided with a forwardly-projecting cylindrical flange $b^2$, while the member G has a rearwardly-projecting annular flange $g^4$, which flanges interlock and determine the relative position of said members B and G. These members are rigidly fastened together by the screws K, wherefore the die-carrying head B will be rotated when the shaft J is rotated.

Rotatively mounted upon the flange $b^2$ and lying, therefore, between the head B and member G is a cam-ring N. Certain guide-blocks M, lying and radially movable in recesses $b^4$ in the member B and between it and this ring N, pass also through holes $b^5$ in the head. Each of these guide-blocks has a pin $m$, which enters a cam-groove $n$ in the rear face of the ring N, wherefore by the turning of this ring these blocks are caused to move toward or from the axis of the head B. The function of these blocks is to accurately center the pipe or rod and to prevent lateral deflection thereof while it is being cut off by the cutting-off tool W. This tool is mounted in the head and projects into the central opening therein, and it is movable endwise toward and from the axis of the head by a screw W'. Any suitable tool, movable as stated, and any suitable mechanism for moving it may be employed in lieu of said parts as shown and described. In the periphery of this ring N is one or more holes $n'$, into which an operating rod or pin may be placed whereby to turn said ring. In the front face of this ring is an arc-shaped groove or recess $n^2$, and through this recessed part of the ring is an arc-shaped slot $n^3$. A bolt P passes through the head B and through this slot $n^3$ and is provided with a head $p$, which is let into said groove $n^2$. A tightening-nut $p'$ is screwed onto the outer end of this bolt, and when the ring N has been moved so as to bring the guide-blocks into the proper position it is clamped to the member B by this bolt.

Projecting forward from the frame A are two horizontal bars R R, upon which is slidably mounted a frame T, which carries the vise for holding the pipe upon which the thread is to be cut. One of these supports R has rack-teeth $r$ on its under side, and a pinion $v'$, secured to a shaft V, which is mounted in the vise-frame T, engages with this rack. By turning this shaft the vise-support and vise are moved, carrying the pipe, which the vise is holding, into operative relationship with the cutting-dies. The vise consists of two inversely-movable jaws $w\ w$, located, respectively, above and below the axis of the machine. One of them is secured to a frame $w^2$, slidably mounted in the vise-support T. A screw Y passes through the upper member of said frame and has an operating hand-wheel $y^2$ secured to it just above the vise-frame, whereby endwise movement of the screw is prevented. The external threads of this screw screw into the upper member of the frame $w^2$, which carries the lower vise-jaw $w$. This screw is hollow and is internally threaded and screws upon a threaded stud $w^3$, secured to the other vise-jaw. By turning the hand-wheel two vise-jaws $w\ w$ are moved simultaneously but inversely toward or from the interposed pipe.

Since the pipe or bar is passed into the machine from that side thereof on which the vise is found, that side of each part which faces toward the vise is herein called the "front" side thereof.

Having described my invention, I claim—

1. The combination of an annular frame having in its rear face an annular recess, and a rotatable member consisting of two parts which are rigidly secured together, to wit, a die-stock head, and the member G having a forwardly-projecting cylindrical flange which is rotatably mounted in the annular recess in the frame and has gear-teeth on its front face, said compound rotatable member having a cylindrical portion $b^2$, a cam-ring rotatably mounted thereon, means for rigidly fastening said cam-ring to said member, and a plurality of radially-movable guide-blocks mounted in said compound member, which blocks and cam-ring engage substantially as described, whereby the turning of the cam-ring moves said guide-blocks inwardly and outwardly, a cutting-off tool movably mounted in said head, operating mechanism for said tool, a rotatable shaft mounted in the frame, and a gear secured thereto and engaging with the gear on the member G, substantially as specified.

2. The combination of an annular frame having in its rear face an annular recess, an annular member G having a cylindrical flange which is rotatably mounted in said recess and has bevel-gear teeth on its front face, a die-stock head which is secured to the member G and has a cylindrical portion $b^2$ adjacent to said member, a cam-ring rotatably mounted on said cylindrical portion and lying between the member G and the die-stock head, a plurality of radially-movable guide-blocks which are supported by said head and which engage with and are operated by said cam-ring, and mechanism for locking said cam-ring to the die-stock head, a cutting-off tool movably mounted in said head, operating mechanism for said tool, a bevel-gear mounted in said frame and engaging with the bevel-gear teeth on the member G, a vise which is slidable in a path parallel with the axis of the die-stock head, substantially as specified.

3. The combination of an annular frame having in its rear vertical face an annular recess, and an annular member G having a cylindrical flange which is rotatably mounted in said recess and is provided with beveled-gear teeth on its front face, said member having also an annular rabbet in its outer edge, and an annular gib fixed to the frame and engaging in said rabbet, a die-stock head secured to the member G and having adjacent thereto a cylindrical portion $b^2$, a cam-ring rotatably mounted upon said cylindrical portion, a plurality of guide-blocks supported by and radially movable in the die-stock head, said ring having in its rear face cam-grooves, and the guide-blocks having pins which project into said grooves, means for locking the cam-ring to the die-stock head, a cutting-off tool movably mounted in said head, operating mechanism for said tool, and a beveled gear mounted in the frame and engaging with the bevel-gear teeth on the member G, substantially as specified.

4. The combination of an annular frame having in its rear face an annular recess, a member G having a cylindrical flange which is rotatably mounted in said recess and has bevel-gear teeth on its front edge, a bevel-gear mounted in the frame and engaging with said gear-teeth, a die-stock head secured to the member G and having adjacent thereto a forwardly-projecting cylindrical portion $b^2$, a plurality of guide-blocks supported by and radially movable in the die-stock head, a cam-ring rotatably mounted upon the cylindrical portion $b^2$ and provided on its rear face with cam-grooves which receive pins secured to the guide-blocks, said ring having an arc-shaped recess in its front face and an arc-shaped slot through said recessed portions, and a clamping-bolt passing through said slot and through the die-stock head, and having its head fitted into the arc-shaped groove in the cam-ring, and a nut screwed to the projecting end of said bolt whereby to lock the cam-ring to the die-stock head, substantially as described.

In testimony whereof I hereunto affix my signature in the presence of two witnesses.

HERMAN W. OSTER.

Witnesses:
ALBERT H. BATES,
E. L. THURSTON.